(12) United States Patent
Dickey

(10) Patent No.: US 8,539,367 B2
(45) Date of Patent: Sep. 17, 2013

(54) AUTOMATIC RE-POSITIONING OF GRAPHICAL PROGRAM NODES DURING NODE PLACEMENT OR NODE MOVEMENT

(75) Inventor: Roger F. Dickey, Austin, TX (US)

(73) Assignee: National Instruments Corporation, Austin, TX (US)

( * ) Notice: Subject to any disclaimer, the term of this patent is extended or adjusted under 35 U.S.C. 154(b) by 980 days.

(21) Appl. No.: 11/862,488

(22) Filed: Sep. 27, 2007

(65) Prior Publication Data

US 2009/0089715 A1 Apr. 2, 2009

(51) Int. Cl.
*G06F 3/048* (2013.01)
*G06T 11/20* (2006.01)

(52) U.S. Cl.
USPC ............ 715/763; 715/853; 345/440; 345/672

(58) Field of Classification Search
USPC ................. 715/762, 763, 853, 866; 345/440, 345/672
See application file for complete search history.

(56) References Cited

U.S. PATENT DOCUMENTS

| | | | |
|---|---|---|---|
| 5,123,087 A | | 6/1992 | Newell et al. |
| 5,237,648 A | * | 8/1993 | Mills et al. .................... 715/723 |
| 5,301,336 A | | 4/1994 | Kodosky et al. |
| 5,371,845 A | | 12/1994 | Newell et al. |
| 5,555,357 A | * | 9/1996 | Fernandes et al. ............ 345/441 |
| 5,588,108 A | * | 12/1996 | Kumar et al. .................. 715/765 |
| 5,943,062 A | * | 8/1999 | Schanel ........................ 345/440 |
| 5,943,486 A | * | 8/1999 | Fukui et al. .................... 716/123 |
| 6,396,520 B1 | * | 5/2002 | Ording .......................... 715/798 |
| 6,774,899 B1 | * | 8/2004 | Ryall et al. .................... 345/440 |
| 7,046,246 B2 | * | 5/2006 | Saitou ........................... 345/440 |
| 7,296,242 B2 | | 11/2007 | Agata et al. |
| 7,477,263 B2 | * | 1/2009 | Saillet et al. .................. 345/619 |
| 2003/0222872 A1 | * | 12/2003 | Lin et al. ....................... 345/440 |
| 2005/0060665 A1 | * | 3/2005 | Rekimoto ..................... 715/810 |
| 2007/0057951 A1 | * | 3/2007 | Anthony et al. .............. 345/473 |

OTHER PUBLICATIONS

"HP VEE 5.0 Evaluation Kit." 1998. Hewlett-Packard.*
Prochnow, et al.; "KIEL: Textual and Graphical Representations of Statecharts"; SYNCHRON '05; Nov. 2005; 54 pages.

* cited by examiner

*Primary Examiner* — Kieu Vu
*Assistant Examiner* — Blaine Basom
(74) *Attorney, Agent, or Firm* — Meyertons Hood Kivlin Kowert & Goetzel, P.C.; Jeffrey C. Hood

(57) ABSTRACT

A system and method for automatically re-positioning one or more nodes in a block diagram of a graphical program in response to a new node being displayed in the block diagram are described. A new node may be displayed at a first position in the block diagram in response to user input. One or more of the plurality of nodes already in the block diagram may be automatically re-positioned in response to displaying the new node at the first position. In other embodiments, a particular node in the block diagram may be moved from a first position to a second position in response to user input, and one or more of the other nodes may be automatically re-positioned in response to the user moving the node.

17 Claims, 27 Drawing Sheets

AUTOMATIC RE-POSITIONING OF GRAPHICAL PROGRAM NODES DURING NODE PLACEMENT OR NODE MOVEMENT

FIELD OF THE INVENTION

The present invention relates to the field of graphical programming, and more particularly to a system and method for automatically re-positioning nodes in a block diagram of a graphical program when a new node is placed in the block diagram or when a node already present in the block diagram is moved to a new position.

DESCRIPTION OF THE RELATED ART

Traditionally, text-based programming languages have been used by programmers in writing application programs. Many different text-based programming languages exist, including BASIC, C, C++, Visual C++, Java, FORTRAN, Pascal, COBOL, ADA, APL, etc. Increasingly, computers are required to be used and programmed by those who are not highly trained in computer programming techniques. When traditional text-based programming languages are used, the user's programming skills and ability to interact with the computer system often become a limiting factor in the user's efficiency of creating a computer program.

Graphical programming development environments that enable a user to create a program in a graphical manner without necessarily writing source code in a text-based programming language have been developed. Graphical programming development environments enable a user to create a software program by including a plurality of nodes or icons in a block diagram and interconnecting the nodes or icons, e.g., such that the interconnected plurality of nodes or icons visually indicates functionality of the resulting software program (called a "graphical program"). The resulting interconnected nodes may visually indicate a function or process performed by the graphical program during its execution.

Graphical programming has become a powerful tool available to programmers. Graphical programming development environments such as National Instruments Corp.'s LabVIEW product have become very popular. Tools such as LabVIEW have greatly increased the productivity of programmers, and increasing numbers of programmers are using graphical programming development environments to develop their software applications. In particular, graphical programming tools are being used for applications such as test and measurement, data acquisition, process control, man machine interface (MMI), supervisory control and data acquisition (SCADA) applications, modeling, simulation, image processing/machine vision applications, and motion control, among others.

SUMMARY OF THE INVENTION

Various embodiments of a system and method for automatically re-positioning one or more nodes in a block diagram of a graphical program in response to a new node being displayed in the block diagram are described. The block diagram may include a plurality of nodes interconnected to visually indicate functionality of the graphical program, wherein each node is displayed at a respective position in the block diagram. According to some embodiments of the method, a new node (a node not in the plurality of interconnected nodes already in the block diagram) may be displayed at a first position in the block diagram in response to user input. One or more of the plurality of nodes already in the block diagram may be automatically re-positioned in response to displaying the new node at the first position.

Various embodiments of a system and method for automatically re-positioning one or more nodes in a block diagram of a graphical program in response to a user manually re-positioning another node in the block diagram are also described. According to some embodiments of the method, a particular node in the block diagram may be moved from a first position to a second position in response to user input. One or more of the other nodes may be automatically re-positioned in response to the user moving the node.

BRIEF DESCRIPTION OF THE DRAWINGS

A better understanding of the present invention can be obtained when the following detailed description of the preferred embodiment is considered in conjunction with the following drawings, in which.

Figure 1:
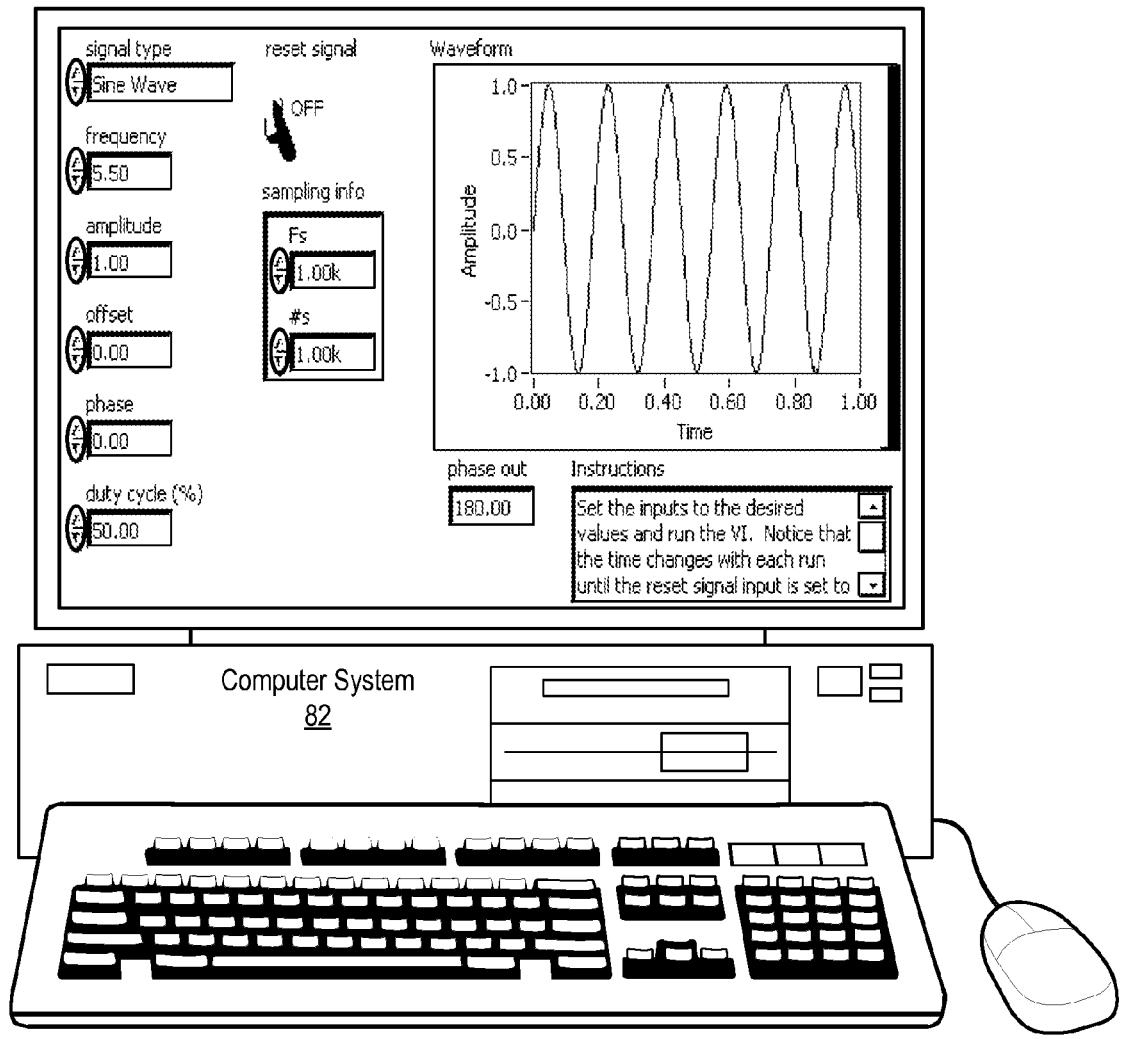
FIG. 1 illustrates an example of a computer system 82 that executes a software application that implements automatic re-positioning of nodes in a graphical program block diagram.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Patent Application Publication No. 20010020291 (Ser. No. 09/745,023) titled "System and Method for Programmatically Generating a Graphical Program in Response to Program Information," filed Dec. 20, 2000.

U.S. Patent Application Publication No. 20050268173 (Ser. No. 10/843,107) titled "Programmatically Analyzing a Graphical Program by Traversing Objects in the Graphical Program," filed May 11, 2004.

U.S. patent application Ser. No. 11/774,651 titled "Automatically Arranging Objects in a Graphical Program Block Diagram," filed Jul. 9, 2007.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DiaDem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes, terminal nodes, structure nodes, etc. Nodes may be connected together in a graphical program by connection icons or wires.

Graphical Data Flow Program (or Graphical Data Flow Diagram)—A graphical program or diagram comprising a plurality of interconnected nodes (blocks), wherein at least a subset of the connections among the nodes visually indicate that data produced by one node is used by another node. A LabVIEW VI is one example of a graphical data flow program. A Simulink block diagram is another example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input the by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Subset—in a set having N elements, the term "subset" comprises any combination of one or more of the elements, up to and including the full set of N elements. For example, a subset of a plurality of icons may be any one icon of the plurality of the icons, any combination of one or more of the icons, or all of the icons in the plurality of icons. Thus, a subset of an entity may refer to any single element of the entity as well as any portion up to and including the entirety of the entity.

Various embodiments of a system and method for automatically re-positioning one or more nodes in a block diagram of a graphical program when a new node is placed in the block diagram, or when a node already present in the block diagram is moved to a new position, are described herein.

A graphical programming development environment or other software application may enable a user to create a graphical program by adding various nodes to a block diagram, e.g., where the nodes are operable to perform various functions. The user may wire the nodes together or otherwise interconnect the nodes so that the interconnected nodes visually indicate functionality of the graphical program, e.g., visually indicate a function or process performed by the graphical program.

As the user adds each new node to the block diagram, the user may indicate a desired position for the new node. In response to the user indicating a desired position for a new node, the graphical programming development environment may in some embodiments automatically re-position one or more nodes already present in the block diagram.

The user may also re-position a node that is already in the block diagram, e.g., by providing user input that causes the node to move to be moved to a new position. In response, the graphical programming development environment may in some embodiments automatically re-position one or more other nodes in the block diagram.

In various embodiments, any kind of software application may implement the automatic re-positioning of the nodes in the graphical program block diagram. For example, in some embodiments, a graphical programming development environment (e.g., a software application that enables users to develop graphical programs) may implement the automatic re-positioning of the nodes.

FIG. 1 illustrates an example of a computer system 82 that may execute the graphical programming development environment application (or other software application) that implements the automatic re-positioning of nodes in a graphical program block diagram. The computer system 82 may include at least one memory medium on which various computer programs, software components, and data structures are stored. In particular, the memory medium may store the graphical programming development environment application, which may be executed by one or more processors of the computer system 82. The memory medium may also store a graphical program. The memory medium may also store operating system software, as well as other software for operation of the computer system.

As shown in FIG. 1, the computer system 82 may also include a display device. The graphical programming development environment application may execute to display a block diagram of the graphical program on the display device. For example, in some embodiments the block diagram may be displayed in an editor window or other graphical user interface that enables a user to edit the block diagram, e.g., by adding nodes to the block diagram, positioning and interconnecting the block diagram nodes in a desired manner, etc.

As described above, the block diagram may include a plurality of nodes interconnected by elements such as lines or wires. Thus, displaying the block diagram may include displaying the plurality of interconnected nodes. Each node may be displayed at a respective position in the block diagram. After the graphical programming development environment automatically re-positions one or more of the nodes as described herein, each node that was re-positioned may be displayed at its new position.

Example Systems

In various embodiments, the graphical program in which one or more nodes are automatically re-positioned as described herein may be a graphical program operable to perform any of various kinds of functions and may be associated with any of various kinds of application. For example, in various embodiments the graphical program may perform functions such as test and/or measurement functions; controlling and/or modeling instrumentation or industrial automation hardware; modeling and simulation functions, e.g., modeling or simulating a device or product being developed or tested, etc. Other examples of test applications where the graphical program may be used include hardware-in-the-loop testing and rapid control prototyping, among others.

However, it is noted that in other embodiments the graphical program may be used for any other type of application and is not limited to the above applications. For example, the graphical program may perform a function such as the control of other types of devices such as multimedia devices, video devices, audio devices, telephony devices, Internet devices, etc., as well as general purpose software applications such as word processing, spreadsheets, network control, network monitoring, financial applications, games, etc.

Figure 2A:
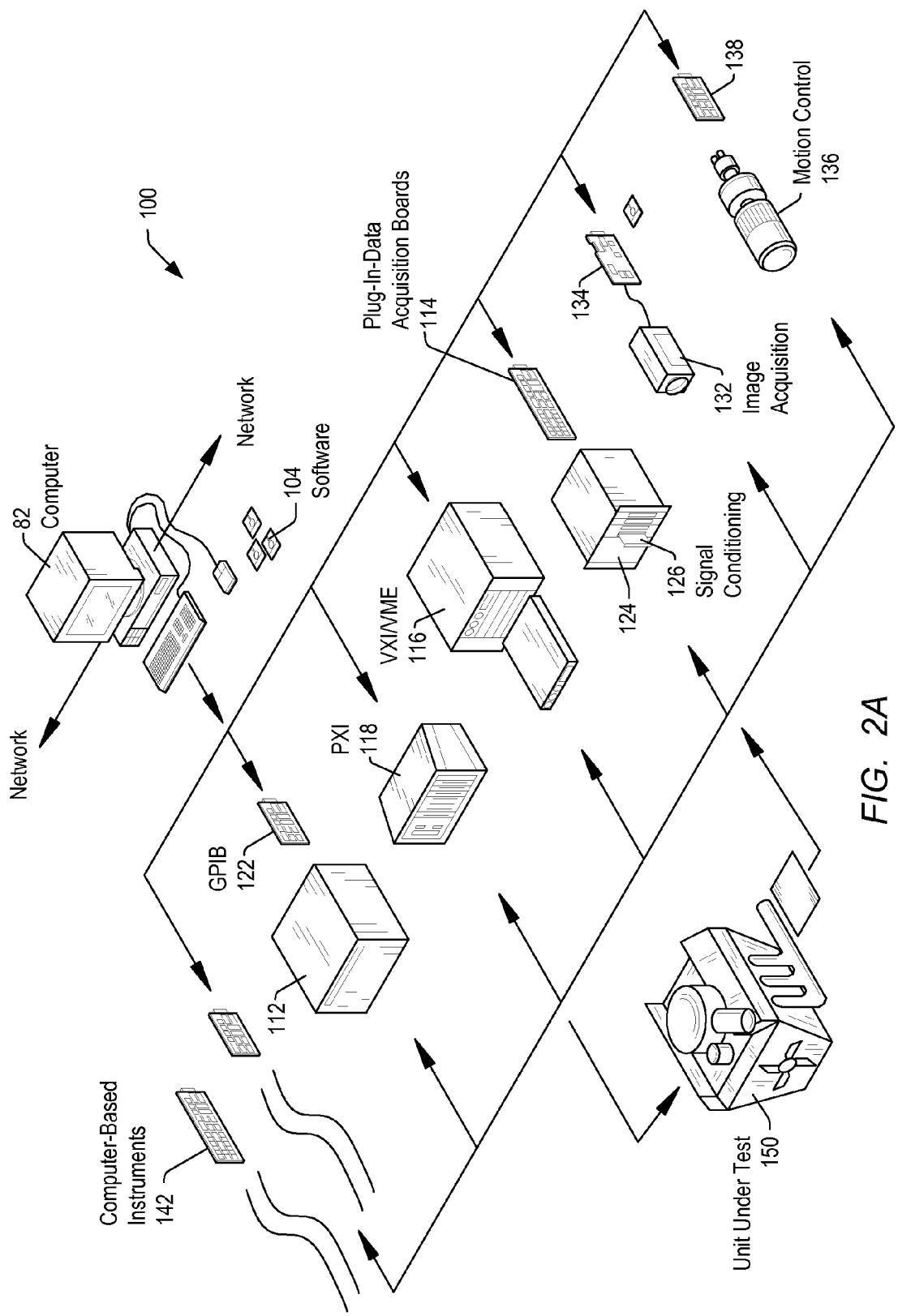
FIG. 2A illustrates an example of an instrumentation control system.

FIG. 2A illustrates an example of an instrumentation control system 100. The system 100 includes a host computer 82 which couples to one or more instruments. The host computer 82 may include one or more processors or CPU's, a display screen, memory, and one or more input devices such as a mouse or keyboard, as shown. In some embodiments the computer 82 may execute the graphical program, where the graphical program operates with the one or more instruments to analyze, measure or control a unit under test (UUT) or process 150.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (UUT) or process 150, or may be coupled to receive field signals, typically generated by transducers. In various embodiments the graphical program may be used in a data acquisition and control application, a test and measurement application, an image processing or machine vision application, a process control application, a man-machine interface application, a simulation application, or a hardware-in-the-loop validation application, among others.

Figure 2B:
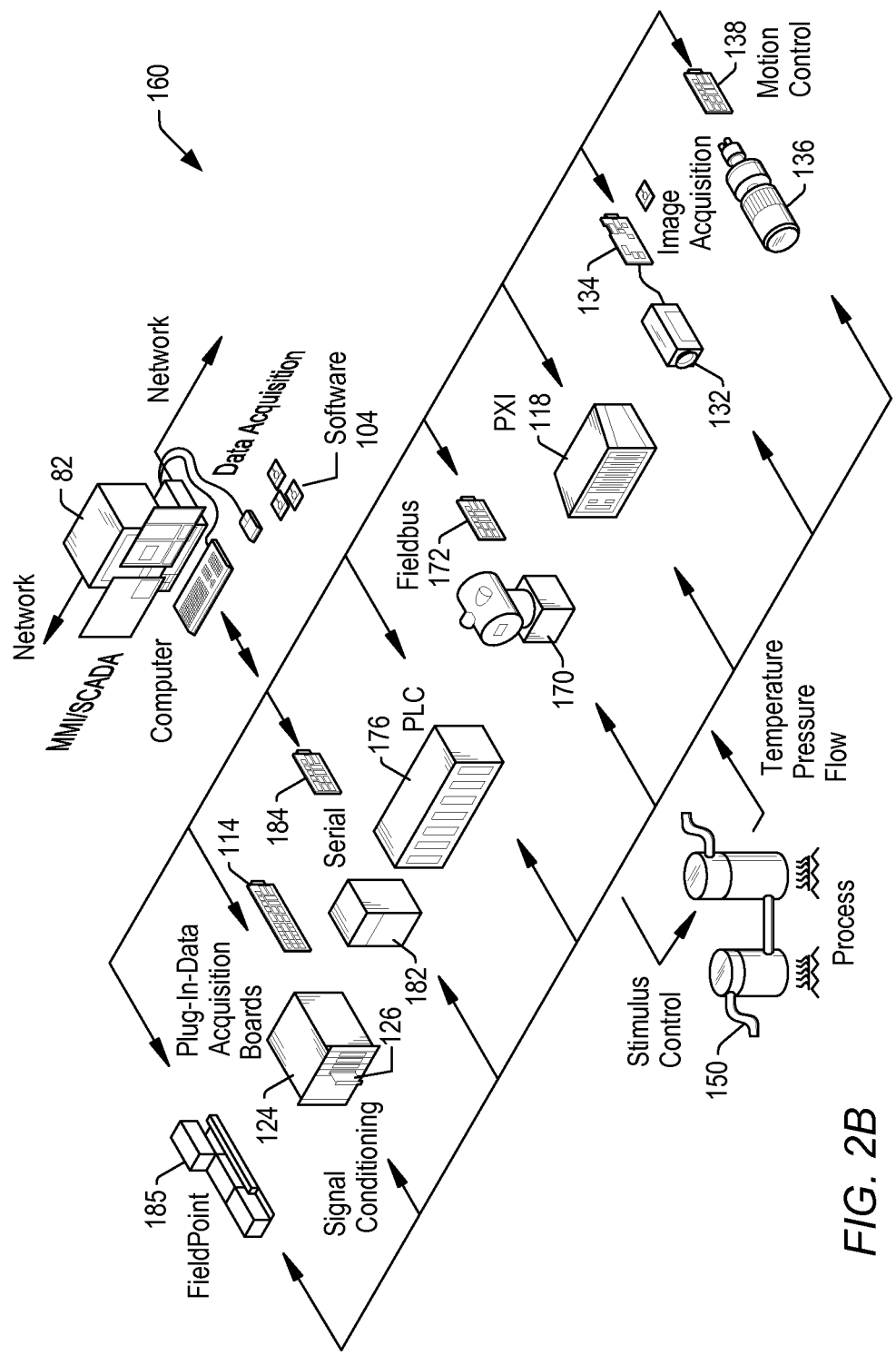
FIG. 2B illustrates an example of an industrial automation system.

FIG. 2B illustrates an example of an industrial automation system 160. The industrial automation system 160 is similar to the instrumentation or test and measurement system 100 shown in FIG. 2A. Elements which are similar or identical to elements in FIG. 2A have the same reference numerals for convenience. The system 160 may include a computer 82 which couples to one or more devices or instruments. The computer 82 may include a CPU, a display screen, memory, and one or more input devices such as a mouse or keyboard as shown. In some embodiments the computer 82 may execute the graphical program, where the graphical program operates with the one or more devices to a process or device 150 to perform an automation function, such as MMI (Man Machine Interface), SCADA (Supervisory Control and Data Acquisition), portable or distributed data acquisition, process control, advanced analysis, or other control, among others.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices. In some embodiments of the systems of FIGS. 2A and 2B, one or more of the various devices may couple to each other over a network, such as the Internet.

Graphical programs which perform data acquisition, analysis and/or presentation, e.g., for measurement, instrumentation control, industrial automation, modeling, or simulation, such as in the applications shown in FIGS. 2A and 2B, may be referred to as virtual instruments.

Figure 3:
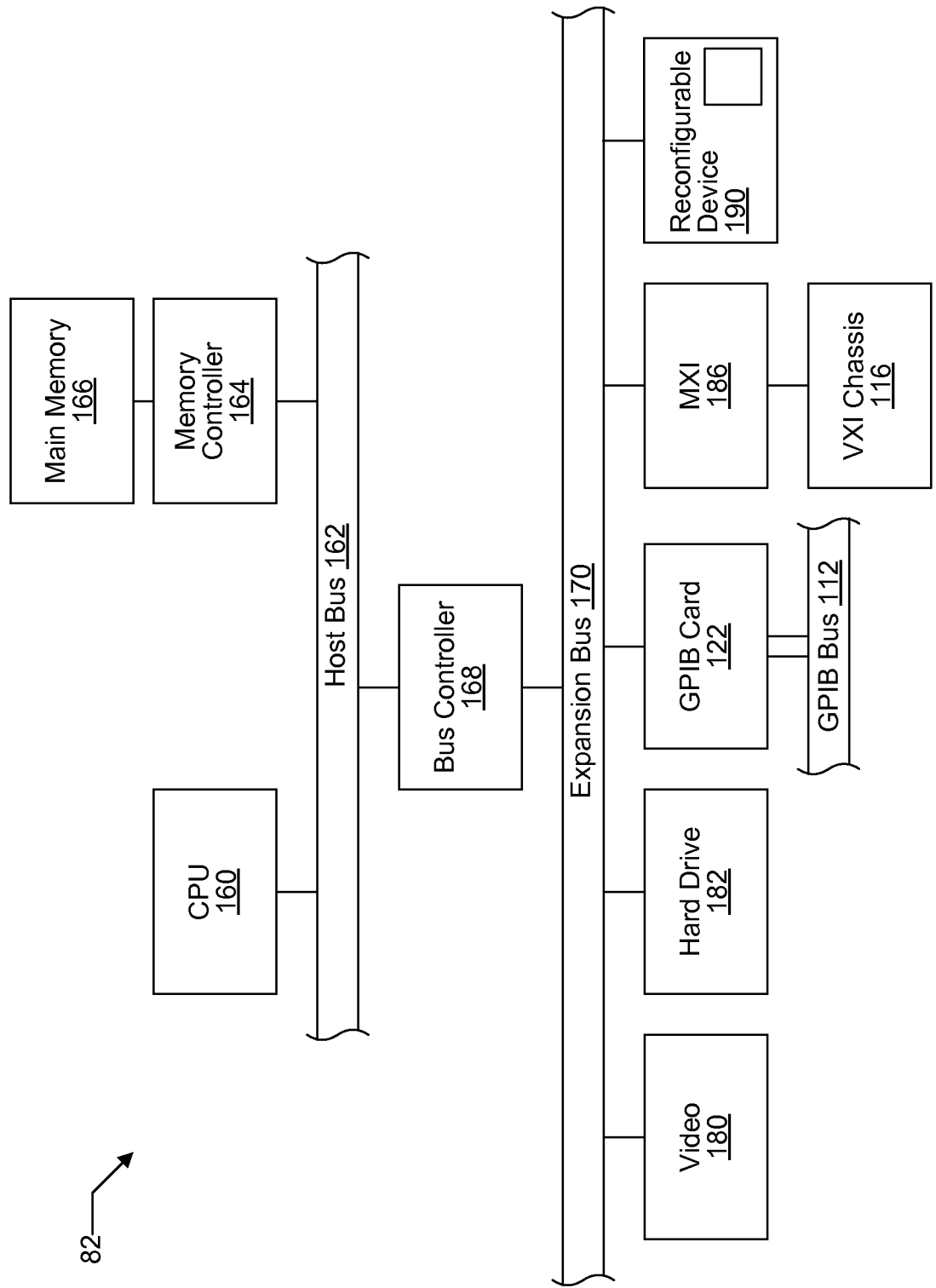
FIG. 3 is a block diagram representing one embodiment of the computer system illustrated in FIGS. 1, 2A, and 2B.

FIG. 3 is a block diagram representing one embodiment of the computer system 82 illustrated in FIGS. 1, 2A, and 2B. It is noted that any type of computer system configuration or architecture can be used as desired, and FIG. 3 illustrates a representative PC embodiment. It is also noted that the computer system may be a general purpose computer system, a computer implemented on a card installed in a chassis, or other types of configurations. Elements of a computer not necessary to understand the present description have been omitted for simplicity.

In this example, the computer system 82 may include at least one central processing unit or CPU (processor) 160 which is coupled to a processor bus or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory 166, is coupled to the host bus 162 by means of memory controller 164.

The main memory 166 may store the graphical programming development environment and the graphical program, where the graphical programming development environment operates to automatically re-position one or more nodes in the block diagram of the graphical program according to the method described below.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further includes a video display subsystem 180 and hard drive 182 coupled to the expansion bus 170.

As shown, in some embodiments a device 190 may also be connected to the computer. The device 190 may include a processor and memory which may execute a real time operating system. The device 190 may also or instead include a programmable hardware element. In some embodiments the computer system may be operable to deploy a graphical program to the device 190 for execution of the graphical program on the device 190. The deployed graphical program may take the form of graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program.

Figure 4:
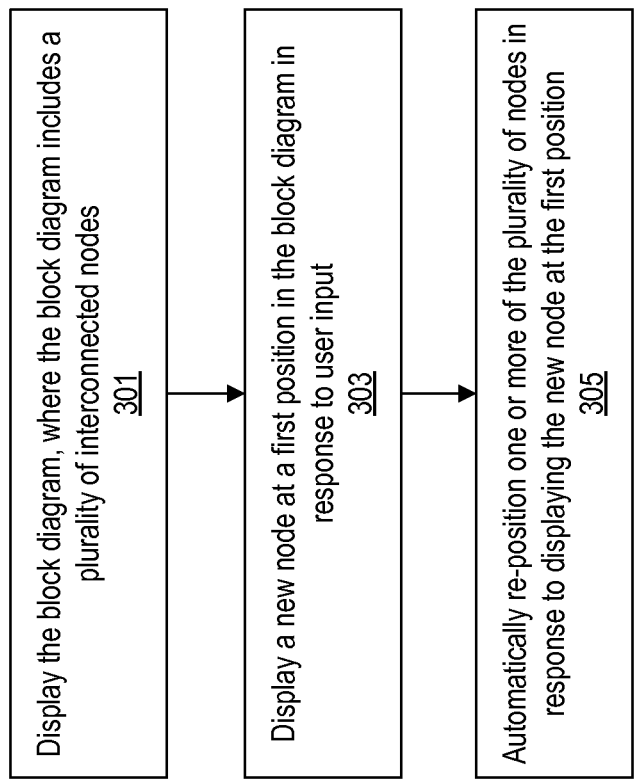
FIG. 4 is a flowchart diagram illustrating one embodiment of a method for automatically re-positioning one or more nodes in a block diagram of a graphical program when a new node is displayed in the block diagram.

FIG. 4 is a flowchart diagram illustrating one embodiment of a method for automatically re-positioning one or more nodes in a block diagram of a graphical program when a new node is displayed in the block diagram. The method may be implemented by the graphical programming development environment.

In 301, the block diagram of the graphical program may be displayed. For example, the graphical programming development environment may display the block diagram in an editor window or other graphical user interface that enables a user to edit the block diagram, e.g., by adding nodes to the block diagram, positioning and interconnecting the block diagram nodes in a desired manner, etc.

The block diagram may include a plurality of nodes interconnected to visually indicate functionality of the graphical program, wherein each node is displayed at a respective position in the block diagram. In various embodiments, the graphical program may be any type of graphical program. For example, the nodes in the block diagram may be interconnected according to any of a data flow, control flow, and/or execution flow format.

In some embodiments the graphical program may be a graphical data flow program, e.g., a graphical program which visually indicates data flow among the nodes. For example, a wire or line connecting two nodes may indicate that output data produced by one node is passed as input data to the other node. In some embodiments the nodes in the block diagram may be arranged such that left-to-right data flow semantics is obeyed. For example, if one node produces data that is passed as input to another node, the first node may be positioned to the left of the second node. Thus, it may be easily seen that data flows from left to right along each wire in the block diagram.

In 303, a new node (a node not in the plurality of interconnected nodes displayed in 301) may be displayed at a first position in the block diagram in response to user input. In 305, one or more of the plurality of nodes displayed in 301 may be automatically re-positioned in response to displaying the new node at the first position. Automatically re-positioning the one or more nodes may comprise re-positioning the one or more nodes without the user manually re-positioning the one or more nodes and without receiving user input specifying the new positions for the one or more nodes. The one or more nodes may be automatically re-displayed at their respective new positions.

For example, in some embodiments, 303 may comprise displaying the new node at the first position in the block diagram in response to the user adding the new node to the block diagram at the first position. In various embodiments, the graphical programming development environment may enable the user to add the new node to the block diagram and position the new node at the first position in any of various ways. As one example, the graphical user interface of the graphical programming development environment may include one or more palettes from which the user can select various types of nodes to include in the block diagram. In some embodiments, the user may utilize a drag-and-drop technique to add the new node to the block diagram. For example, the user may click on a desired node in a palette with a pointing device, such as a mouse device, drag the node into the block diagram, and drop the node at the first position. This may cause the node to be added to the block diagram. In other embodiments, the graphical user interface of the graphical programming development environment may enable the user to add a new node to the block diagram in any of various other ways.

In response to the user adding the new node to the block diagram at the first position, the graphical programming development environment may automatically determine that one or more of the nodes that were already in the block diagram should be re-positioned. The graphical programming development environment may also automatically determine a respective new position for each of the one or more nodes and may automatically re-position each one to its respective new position.

In various embodiments, the graphical programming development environment may utilize any of various types of algorithms, heuristics, or criteria in order to select which nodes should be automatically re-positioned and to determine their respective new positions. The graphical programming development environment may be operable to automatically analyze the block diagram in order to select which nodes should be re-positioned and to determine their respective new positions. For example, the graphical programming development environment may traverse data structures representing the block diagram to automatically determine information about the block diagram (such as for example, which nodes are present in the block diagram, the current positions of the nodes, how the nodes are connected to each other, etc.), and may select which node(s) should be re-positioned and determine the new positions based on this information.

In some embodiments, the one or more nodes may be automatically re-positioned in order to maintain or re-arrange the block diagram in an aesthetically pleasing fashion or in a fashion enabling the user to efficiently view or understand the block diagram. For example, in some embodiments, the one or more nodes may be automatically re-positioned in response to the graphical programming development environment determining that the one or more nodes are less than a minimum or threshold distance away from the new node that the user added to the block diagram, e.g., if the user added the new node at a position very close to one or more of the nodes that were already in the block diagram. The one or more nodes may be automatically re-positioned in order to move them further away from the new node, which may enable the user to more efficiently view or understand the block diagram and/or may result in a more aesthetically pleasing block diagram. In some embodiments the one or more nodes that are re-positioned may also include a node or nodes that are further away than the minimum or threshold distance from the new node.

In other embodiments, 303 may comprise displaying the new node at the first position in response to user input indicating the first position as a possible position for the new node in the block diagram but without the user necessarily adding the new node to the block diagram. For example, as described above, in some embodiments the user may drag the new node into the block diagram. While dragging the new node, the user may hold down a mouse button, for example. When the new node is at the desired position, the user may release the mouse button to cause the new node to be added to the block diagram at the current position. However, in some embodiments the graphical programming development environment may be operable to automatically re-position nodes in the block diagram before the new node is actually added to the block diagram.

For example, suppose that the user drags the new node to the first position and pauses at the first position without yet dropping the new node. The pause in movement may indicate that the user is considering the first position as a possible position for the new node. In response, the graphical programming development environment may automatically re-position the one or more nodes on a temporary basis, e.g., in order to show the user how the one or more nodes would be automatically re-positioned if the user were to then drop the new node at its current position (the first position). For example, the one or more nodes may include one or more nodes originally positioned proximal to the first position and re-positioned in order to move them further away from the new node, similarly as discussed above.

If the user does drop the new node at its current position then the one or more nodes may remain in their new positions. If, however, the user decides not to drop the new node at its current position then the one or more nodes may not remain in their new positions. For example, if the user decides to cancel the action of adding the new node to the block diagram then the one or more nodes may return to their original positions. Similarly, if after temporarily pausing at the first position the user then continues dragging the new node to another position, the one or more nodes that were automatically re-positioned may return to their original positions. In this case, for example, if the user moves the new node to a second position and temporarily pauses there or adds the new node there then one or more nodes proximal to the second position may be automatically-repositioned in a manner similar as described above.

Thus, in some embodiments, 305 may comprise automatically re-positioning the one or more nodes before the new node is actually added to the block diagram at the first position. Also, in some embodiments, the path of movement along which the user drags the new node before deciding on a final position for the new node may be tracked on a real-time basis, and the positions of nodes already in the block diagram may be dynamically changed in real time, depending on the path of movement. For example, at any given moment, the selection of which nodes (if any) should be re-positioned and the new positions at which the nodes are displayed may depend on where the new node is currently positioned relative to other nodes.

In embodiments in which the graphical programming development environment operates to automatically re-positioned the one or more nodes further away from the new node, the one or more nodes may be moved in any direction away from the new node. For example, a respective node may be moved vertically or horizontally in the block diagram or at an angle other than vertically or horizontally. In some embodiments, the graphical programming development environment may determine a vector from the new node to the respective node and may move the respective node further away from the new node along the vector.

Further embodiments of the method are described below with reference to various graphical programs.

Figure 5:
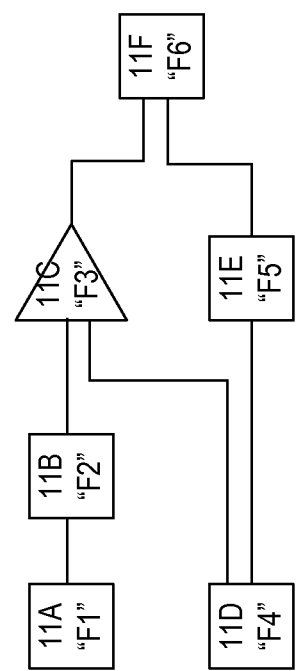
FIGS. 5-7 illustrate an example of automatically re-positioning a node in a block diagram of a graphical program in response to a new node being displayed in the block diagram.

FIG. 5 illustrates one example of a simple graphical program block diagram including a plurality of nodes 11A-11F. Each node 11 is displayed as an icon having a simple geometrical shape. In this example, each node 11 is labeled with text indicating a function performed by the node. For example, node 11A is operable to perform a function named "F1", node 11B is operable to perform a function named "F2", etc. Thus, the user can understand the functionality of the graphical program based on the functions performed by the individual nodes and their relationships with each other.

In other embodiments, nodes in a graphical program may have a graphical appearance which indicates the respective functions performed by the nodes instead of or in addition to being labeled with text describing the respective functions. Also, nodes may be represented by more complex icons other than the simple geometrical shapes illustrated in FIG. 5. It is noted that in other drawings of graphical programs in the present application, the function names (e.g., "F1", "F2", "etc.") are omitted for simplicity of the drawings.

Figure 6:
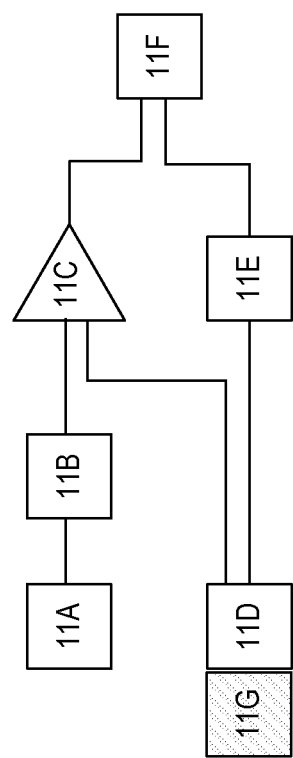
Figure 7:
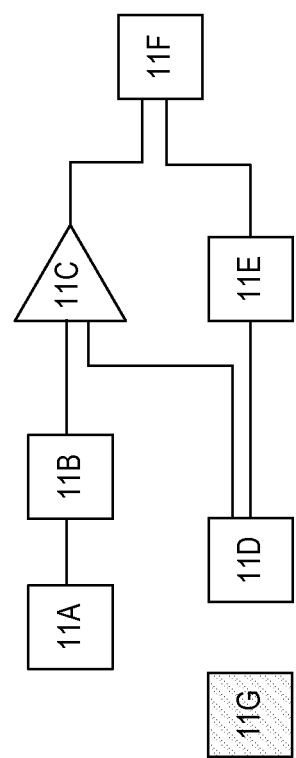

Suppose now that the user causes a new node 11G to be displayed in the block diagram, as illustrated in FIG. 6. For example, the new node 11G may be displayed in the block diagram in response to the user adding the new node 11G to the block diagram or dragging the new node 11G into the block diagram. As illustrated in FIG. 6, the new node 11G has been positioned very close to the node 11D. Thus, the graphical programming development environment may automatically re-position the node 11D. For example, FIG. 7 illustrates an embodiment in which the node 11D has been automatically re-positioned further to the right of the new node 11G. Moving the node 11D further away from the new node 11G may allow more space for connecting wires to the new node 11G and may cause the block diagram to appear less cluttered.

In various embodiments the graphical programming development environment may use any of various algorithms to determine how close a respective node is positioned to the new node and may use any of various criteria to determine whether the respective node is so close to the new node that it needs to be re-positioned further away from the new node.

Figure 8:
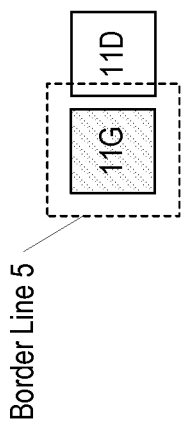
FIGS. 8-11 illustrate examples of techniques for determining whether a node is within a threshold distance of a new node displayed in a block diagram of a graphical program.

In some embodiments the graphical programming development environment may compute a border line surrounding the new node. Any node (other than the new node) which the border line encompasses or overlaps may be automatically re-positioned further away from the new node, e.g., such that the node is outside the border line. For example, FIG. 8 illustrates a border line 5 which the graphical programming development environment has computed around the new node 11G. Since the border line 5 overlaps the node 11D, the node 11D may be automatically moved away from the new node 11G.

Figure 9:
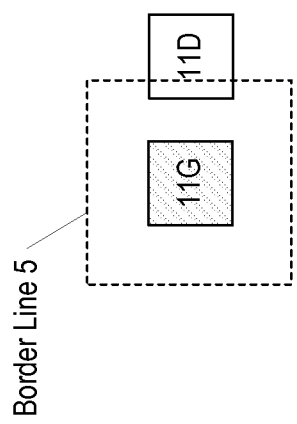

The graphical programming development environment may compute the border line 5 such that the border line 5 is located at any of various distances away from the edges of the new node 11G, e.g., depending on how much empty space is desired between the new node and other nodes. For example, in FIG. 9 the node 11D is further away from the new node 11G. However, the border line 5 also encompasses a greater area. Thus, the node 11D may still be automatically moved away from the new node 11G in this example, since the border line 5 still overlaps the node 11D.

Figure 10:
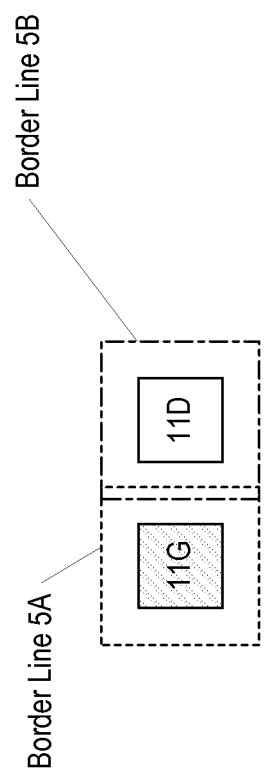

In other embodiments, the graphical programming development environment may compute a border line around other nodes in the block diagram as well as the border line around the new node. If any point in the area enclosed by the border line for a given node falls within the area enclosed by the border line for the new node then the given node may be automatically moved away from the new node. For example, in FIG. 10 the graphical programming development environment has computed a border line 5A around the new node 11G and a border line 5B around the node 11D. Thus, the node 11D may be automatically moved away from the new node 11G since the areas enclosed by the respective border lines overlap.

Figure 11:
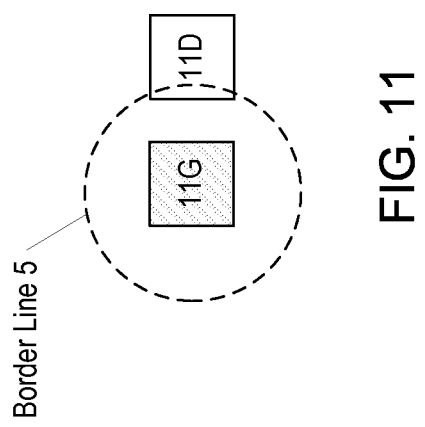

In various embodiments the graphical programming development environment may compute a border line of any regular or irregular shape surrounding the new node. In some embodiments the border line may have a regular geometrical shape, such as that of a square, rectangle, circle, oval, etc. For example, in FIG. 11 the graphical programming development environment has computed a border line having a circular shape around the new node 11G. In other embodiments the border line may have a more complex or non-regular shape.

Figure 12:
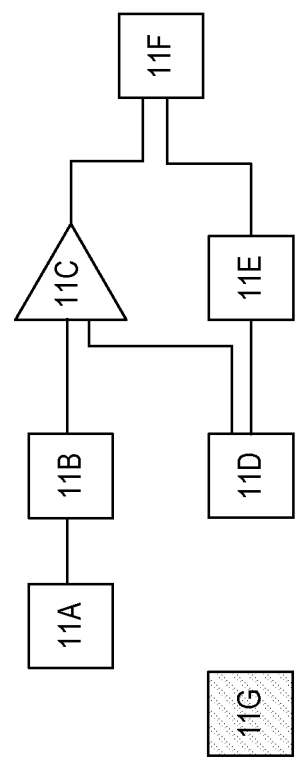
FIG. 12 illustrates an additional example of automatically re-positioning a node in a block diagram of a graphical program in response to a new node being displayed in the block diagram.

In some embodiments, when the graphical programming development environment computes the new position for a respective node being automatically moved away from the new node, the graphical programming development environment may take into account the positions of one or more nodes other than the new node. For example, in some embodiments the graphical programming development environment may re-position the respective node such that the respective node is aligned with one or more of the other nodes in the block diagram. For example, FIG. 12 illustrates an example in which the graphical programming development environment has automatically moved the node 11D further away from the new node 11G, similarly as in the example of FIG. 7. However, in FIG. 12 the graphical programming development environment has moved the node 11D further to the right than what is illustrated in FIG. 7 so that the node 11D is horizontally aligned with the node 11B. In this example, the left and right edges of the node 11D is exactly aligned with the left and right edges of the node 11B.

Figure 13:
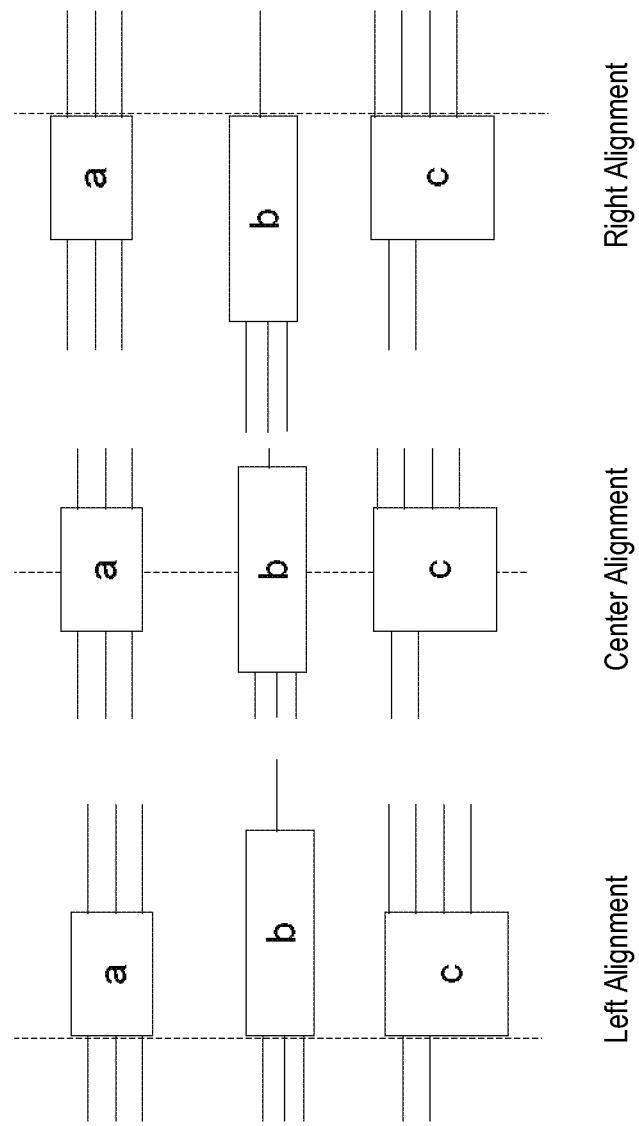
FIGS. 13 and 14 illustrate examples of alignment techniques that may be utilized in determining the new position(s) for the one or more nodes that are automatically re-positioned.

In various embodiments the graphical programming development environment may utilize any kind of horizontal or vertical alignment technique in determining where to re-position a given node. For example, FIG. 13 illustrates three examples in which nodes a, b, and c have been aligned using left alignment, center alignment, and right alignment. In left alignment, the left edges of the nodes are matched. In right alignment, the edges sides of the nodes are matched. In center alignment, the centers of the nodes are matched.

Figure 14:
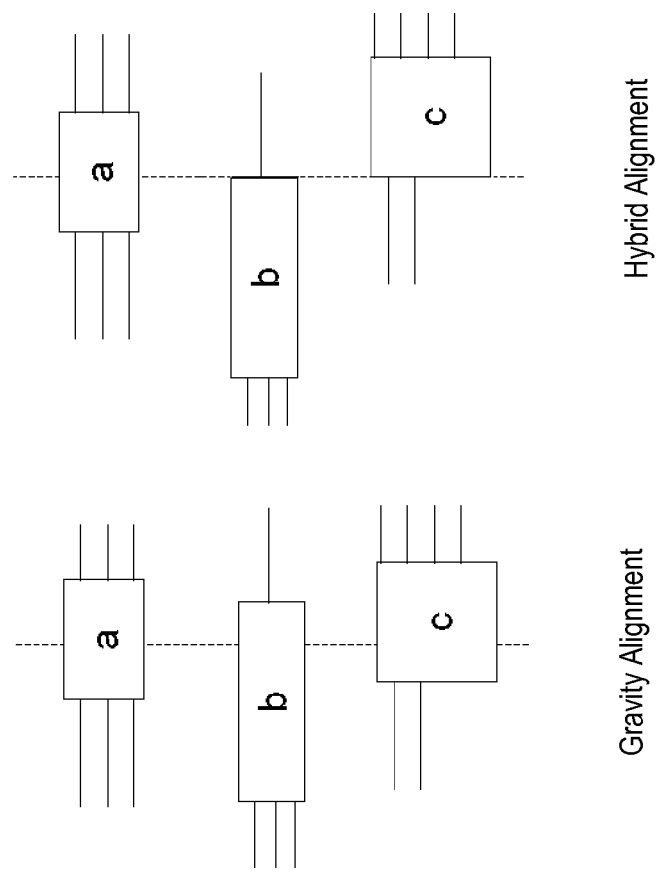

FIG. 14 illustrates two other examples of alignment techniques, referred to as gravity alignment and hybrid alignment. These alignment techniques may result in a more natural staggered appearance, while still keeping the block diagram ordered. These alignment techniques may also help reduce the lengths of the wires. In the gravity alignment technique the X coordinates of the nodes may be set as follows:

The X coordinates will be $(x+\delta x)$, where x=the X coordinate that would be assigned when the blocks are aligned by left alignment; and $\delta x$=the gravity pull towards the destination. The gravity pull may be calculated as $f(w_i, w_o, \omega, W)$, where $w_i$=input wires; $w_o$=output wires; $\omega$=width of the node; W=width of the widest node; and $0 \leq \delta x \leq \omega$.

For the hybrid alignment technique, $\delta x$ is one of $\{0, (W-\omega)/2, W-\omega\}$.

Figure 15:
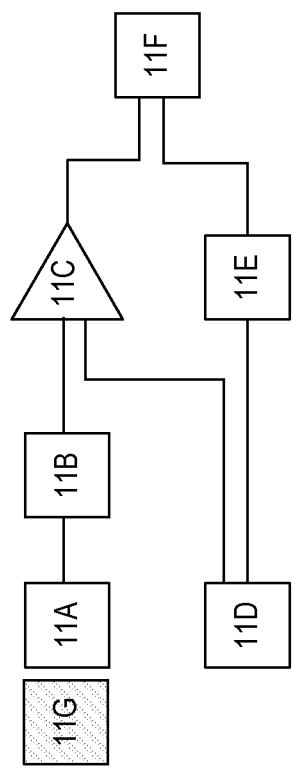
FIGS. 15 and 16 illustrate an example of automatically re-positioning a plurality of nodes in a block diagram of a graphical program in response to a new node being displayed in the block diagram.
Figure 16:
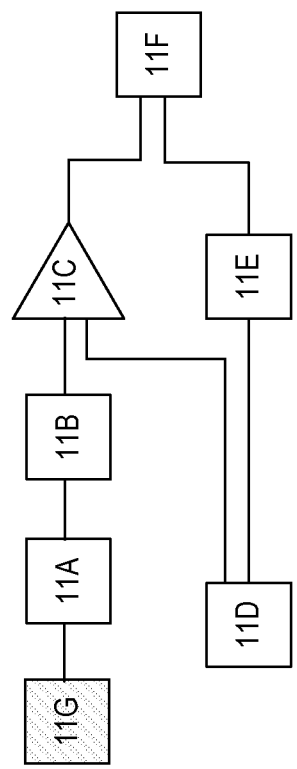

FIG. 15 illustrates an example in which the user has caused the new node 11G to be displayed next to the node 11A instead of the node 11D as shown previously. In response to the new node 11G being displayed at the illustrated position, the graphical programming development environment may determine that the node 11A is located within a threshold distance from the new node 11G and may automatically re-position the node 11A further to the right of the new node 11G. However, re-positioning the node 11A may cause the node 11A to appear very close to or overlapping the left edge node 11B. Thus, in addition to re-positioning the node 11A, the graphical programming development environment may also re-position the node 11B. For example, as illustrated in FIG. 16, both the node 11A and the node 11B have been moved to the right of their previous positions.

Thus, in some embodiments, when a first node is automatically re-positioned to a new position, and a second node is already positioned proximal to the new position, the graphical programming development environment may also automatically re-position the second node in order to move the second node away from the new position of the first node. For example, re-positioning one node in the block diagram may cause one or more other nodes to also be automatically re-positioned in a cascading fashion. Thus, in some embodiments, automatically re-positioning the one or more nodes in 305 of FIG. 4 may comprises automatically re-positioning one or more nodes proximal to the new node (e.g., one or more nodes having an edge located within a threshold distance of an edge of the new node) as well as automatically re-positioning one or more other nodes that are not proximal to the new node.

Figure 17:
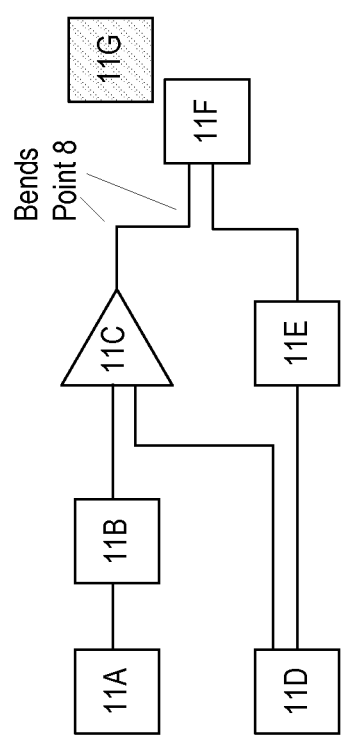
FIGS. 17-23 illustrate additional examples of automatically re-positioning a node in a block diagram of a graphical program in response to a new node being displayed in the block diagram.
Figure 18:
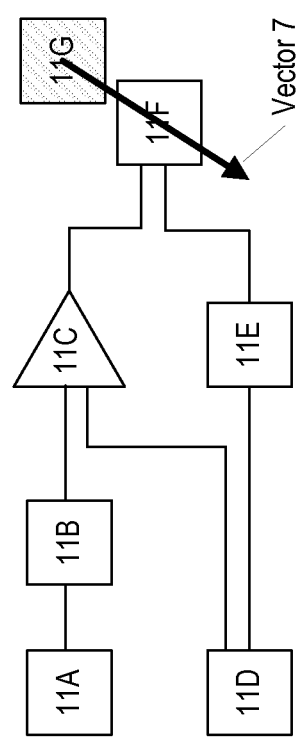
Figure 19:
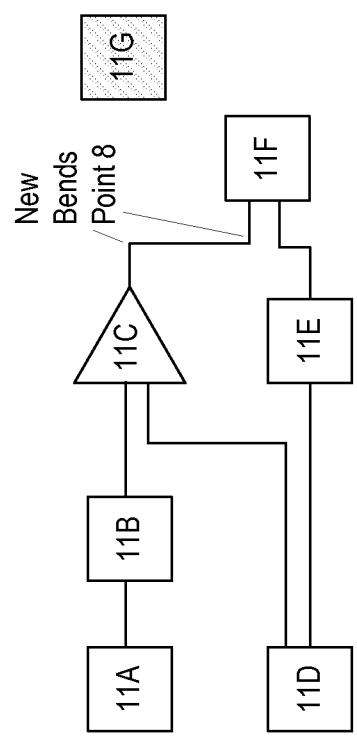

FIG. 17 illustrates an example in which the user has caused the new node 11G to be displayed next to the node 11F instead of the nodes 11A or 11D as shown previously. In response, the graphical programming development environment may re-position the node 11F further away from the new node 11G. In some embodiments, the graphical programming development environment may determine the direction in which to move the node 11F by computing a vector from the new node 11G to the node 11F and moving the node 11F in the direction of the vector. For example, as illustrated in the example of FIG. 18, the graphical programming development environment has computed a vector 7 from the new node 11G to the node 11F. Thus, the node 11F may be automatically re-positioned away from the new node 11G in the direction of the vector 7, as illustrated in FIG. 19.

As described above, the nodes in the graphical program may be connected by connector elements such as wires or lines. In some embodiments the method may further comprise re-routing or re-displaying one or more of the lines or wires in response to the new node being displayed in the block diagram. In particular, the method may operate to re-route one or more lines or wires connected to a node that is automatically re-positioned.

For example, as illustrated in FIG. 17, the wire connecting the node 11C and the node 11F has two bend points 8 where the wire changes from a horizontal direction to a vertical direction or vice versa. In addition to automatically re-positioning the node 11F, the graphical programming development environment may also automatically compute new bend points for the wire and re-route or re-display the wire such that the wire follows a path through the new bend points, as illustrated in FIG. 19.

Figure 20:
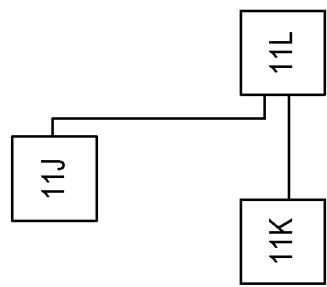
Figure 21:
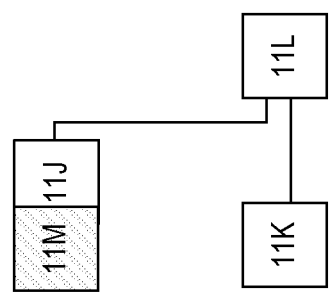
Figure 22:
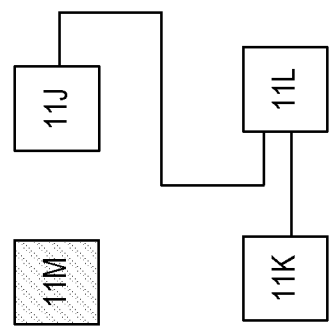
Figure 23:
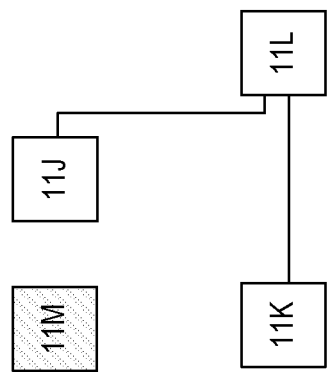

In some embodiments, the graphical program may comprise a data flow graphical program, and the nodes in the block diagram may be arranged such that left-to-right data flow semantics is obeyed. For example, in the simple block diagram of FIG. 20, data flows from left to right from the node 11J to the node 11L and from the node 11K to the node 11L. Suppose that the user now adds a new node 11M overlapping the node 11J, as illustrated in FIG. 21. In some embodiments the graphical programming development environment may re-position the node 11J by moving it further to the right, as illustrated in FIG. 22. However, this may violate the left-to-right data flow semantics of the block diagram, since the output terminal of the node 11J is further to the right than the input terminal of the node 11L, thus causing data to appear to flow from right to left. This may make it difficult for the user to easily understand the data flow relationships among the nodes. Thus, in some embodiments, in addition to moving the node 11J to the right, the graphical programming development environment may also move the node 11L to the right, allowing the left-to-right data flow semantics to remain intact, as shown FIG. 23.

In some embodiments the graphical programming development environment may display an animation of the movement of the one or more nodes that are automatically re-positioned in response to the new node being displayed in the block diagram. The animation may enable the user to see the movement of the one or more nodes along the respective paths from their initial positions to their new positions. For example, when the nodes 11A and 11B are automatically re-positioned in the example of FIG. 16 above, the movement of the nodes 11A and 11B may be animated. In some embodiments the animation may be displayed such that both of the nodes appear to move along their respective paths simultaneously with each other. In other embodiments the animation may be displayed such that both of the nodes appear to move along their respective paths separately from each other. For example, the graphical programming development environment may first display an animation of the movement of the node 11B and may then display an animation of the movement of the node 11A.

Figure 24:
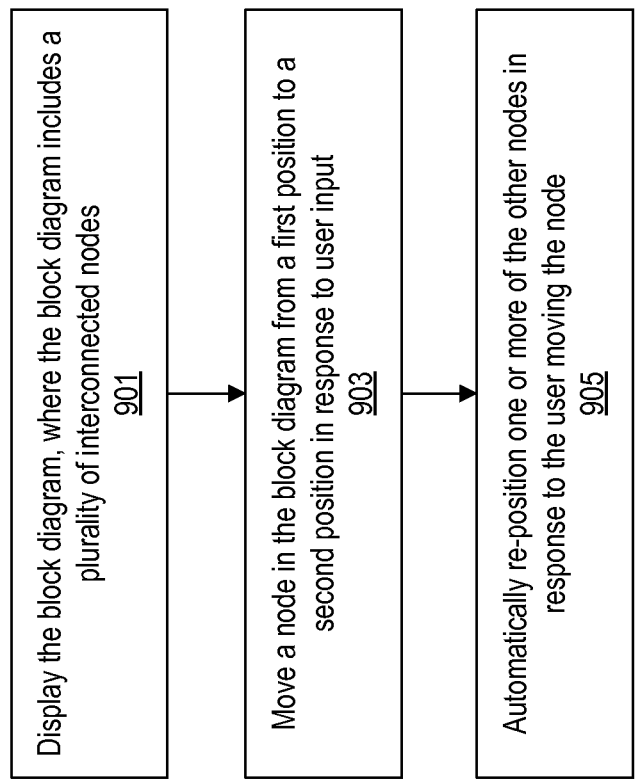
FIG. 24 is a flowchart diagram illustrating one embodiment of a method for automatically re-positioning one or more nodes in a block diagram of a graphical program in response to user input manually re-positioning another node.

In some embodiments it may be desirable to automatically re-position one or more nodes in a graphical program block diagram when a user re-positions a node that is already present in the block diagram. FIG. 24 is a flowchart diagram illustrating one embodiment of a method for automatically re-positioning one or more of the block diagram nodes in response to the user manually re-positioning another node. The method of FIG. 24 may be implemented by a software application that enables users to create or edit a graphical program, such as a graphical programming development environment application.

In 901, the block diagram of the graphical program may be displayed. For example, the user may open an existing block diagram in an editor window or create a new block diagram by adding various nodes and interconnecting them such that they visually indicate functionality performed by the graphical program.

In 903, a particular node in the block diagram may be moved from a first position to a second position in response to user input. For example, the user may move the particular node to a more logical place in the block diagram.

In 905, one or more of the other nodes may be automatically re-positioned in response to the user moving the node. As one example, of the user moves the particular node within a threshold distance of another node then the graphical programming development environment may automatically move the other node further away from the particular node, e.g., to allow more space between the nodes.

In various embodiments the graphical programming development environment may use any of various algorithms to determine which node(s) to automatically re-position and where to re-position the node(s).

Figure 25:
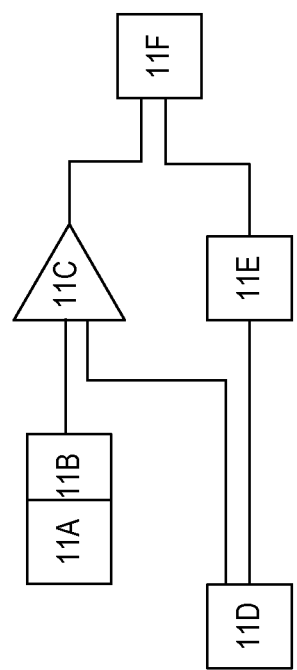
FIGS. 25-26 illustrate an example of automatically re-positioning a node in a block diagram of a graphical program in response to user input manually re-positioning another node.
Figure 26:
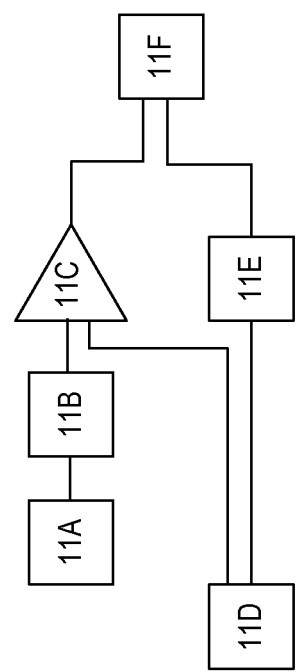

For example, consider again the graphical program block diagram example illustrated in FIG. 5. As shown in FIG. 25, the user may manually re-position the node 11A such that it overlaps the node 11B, e.g., by dragging the node 11A further to the right with a pointing device. In response, the graphical programming development environment may automatically move the node 11B away from the node 11A so that the node 11A no longer overlaps the node 11B and such that the node 11B is at least a threshold distance away from the node 11A. For example, as shown in FIG. 26, the graphical programming development environment may automatically re-position the node 11B further to the right of the node 11A. In this example, the graphical programming development environment has also automatically re-routed the wire connecting the node 11D to the node 11C, e.g., by re-locating a bend point of the wire so that the wire does not overlap the node 11B in its new position.

It is noted that various embodiments may further include receiving, sending or storing instructions and/or data implemented in accordance with the foregoing description upon a computer-readable memory medium.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A non-transitory computer-readable memory medium storing program instructions executable to:

display a block diagram of a graphical data flow program, wherein the block diagram includes a plurality of nodes, wherein the nodes are interconnected to visually indicate functionality of the graphical data flow program, wherein each node is displayed at a respective position in the block diagram, wherein the nodes are arranged in the block diagram to visually indicate left-to-right data flow semantics;

after displaying the block diagram, display a new node at a first position in the block diagram in response to user input; and automatically re-position two or more nodes of the plurality of nodes in response to displaying the new node at the first position, wherein automatically re-positioning the two or more nodes includes:
  automatically re-positioning a first node that passes data as input to a second node, wherein the first node is initially positioned above and leftward of the second node, wherein automatically re-positioning the first node comprises automatically moving the first node in a rightward direction to a new position;
  automatically determining that the new position of the first node violates the left-to-right data flow semantics with respect to the data passed as input to the second node; and
  in response to said determining that the new position of the first node violates the left-to-right data flow semantics, automatically re-positioning the second node in a rightward direction to a new position so that the first node remains positioned above and leftward of the second node, wherein the new position of the second node is not determined based on user input specifying positioning information for the second node.

2. The computer-readable memory medium of claim 1,
wherein the new node is displayed at the first position in the block diagram in response to user input adding the new node to the block diagram at the first position;
wherein the two or more nodes are automatically re-positioned after the new node is added to the block diagram at the first position.

3. The computer-readable memory medium of claim 1,
wherein the new node is displayed at the first position in the block diagram in response to user input dragging the new node into the block diagram and dropping the new node at the first position;
wherein the two or more nodes are automatically re-positioned in response to the new node being dragged and dropped into the block diagram.

4. The computer-readable memory medium of claim 1,
wherein the new node is displayed at the first position in the block diagram in response to user input indicating the first position as a possible position for the new node in the block diagram;
wherein the two or more nodes are automatically re-positioned before the new node is added to the block diagram at the first position.

5. The computer-readable memory medium of claim 4,
wherein the two or more nodes that are automatically re-positioned are a first two or more nodes;
wherein the program instructions are further executable to:
  re-display the new node at a second position in the block diagram in response to user input moving the new node from the first position to the second position;
  automatically re-position the first two or more nodes back to their respective original positions; and
  automatically re-position a second two or more of the plurality of nodes in response to re-displaying the new node at the second position.

6. The computer-readable memory medium of claim 1,
wherein the program instructions are further executable to:
  in response to displaying the new node at the first position, determine that the first node is displayed proximal to the first position;
  wherein automatically re-positioning the first node comprises automatically moving the first node rightward in order to move the first node away from the first position.

7. The computer-readable memory medium of claim 6,
wherein a third node is positioned proximal to the new position of the first node;
wherein automatically re-positioning the two or more nodes further includes automatically re-positioning the third node in order to move the third node away from the new position of the first node.

8. The computer-readable memory medium of claim 6,
wherein determining that the first node is displayed proximal to the first position comprises one of:
  determining that the new node overlaps the first node;
  determining that the first node overlaps the new node.

9. The computer-readable memory medium of claim 6,
wherein determining that the first node is displayed proximal to the first position comprises determining that an edge of the first node is located within a threshold distance from an edge of the new node.

10. The computer-readable memory medium of claim 1,
wherein the two or more nodes that are automatically re-positioned includes a particular node;
wherein the particular node is automatically re-positioned such that the particular node is aligned with one or more other nodes in the block diagram.

11. The computer-readable memory medium of claim 1,
wherein the program instructions are further executable to:
  automatically re-route one or more wires connected to the two or more nodes in response to re-positioning the two or more nodes.

12. The computer-readable memory medium of claim 1,
wherein the program instructions are further executable to:
  automatically select the two or more nodes for re-positioning in response to displaying the new node at the first position.

13. The computer-readable memory medium of claim 1,
wherein automatically re-positioning the two or more nodes comprises automatically analyzing the block diagram to determine a respective new position for each respective one of the two or more nodes.

14. The computer-readable memory medium of claim 1,
wherein automatically re-positioning the two or more nodes comprises displaying an animation that illustrates movement of the two or more nodes to respective new positions in the block diagram, wherein the animation is displayed such that the two or more nodes appear to move along respective paths to their respective new positions simultaneously with each other.

15. The computer-readable memory medium of claim 1,
wherein the program instructions are further executable to:
  drag the new node along a path in the block diagram from the first position to a second position in response to user input; and
  dynamically re-position one or more nodes in the block diagram as the new node is being dragged along the path, wherein the positions of the one or more nodes are changed depending upon the path of movement of the new node.

16. A system comprising:
one or more processors; and
memory storing program instructions;
wherein the program instructions are executable by the one or more processors to implement:
- displaying a block diagram of a data flow graphical program, wherein the block diagram includes a plurality of nodes, wherein the nodes are interconnected to visually indicate functionality of the graphical data flow program, wherein each node is displayed at a respective position in the block diagram, wherein the nodes are arranged in the block diagram to visually indicate left-to-right data flow semantics;
- after displaying the block diagram, displaying a new node at a first position in the block diagram in response to user input; and
- automatically re-positioning two or more nodes of the plurality of nodes in response to displaying the new node at the first position, wherein automatically re-positioning the two or more nodes includes:
  - automatically re-positioning a first node that passes data as input to a second node, wherein the first node is initially positioned above and leftward of the second node, wherein automatically re-positioning the first node comprises automatically moving the first node in a rightward direction to a new position;
  - automatically determining that the new position of the first node violates the left-to-right data flow semantics with respect to the data passed as input to the second node; and
  - in response to said determining that the new position of the first node violates the left-to-right data flow semantics, automatically re-positioning the second node in a rightward direction to a new position so that the first node remains positioned above and leftward of the second node, wherein the new position of the second node is not determined based on user input specifying positioning information for the second node.

17. A method comprising:
- a computer system displaying a block diagram of a graphical data flow program, wherein the block diagram includes a plurality of nodes, wherein the nodes are interconnected to visually indicate functionality of the graphical data flow program, wherein each node is displayed at a respective position in the block diagram, wherein the nodes are arranged in the block diagram to visually indicate left-to-right data flow semantics;
- after displaying the block diagram, the computer system displaying a new node at a first position in the block diagram in response to user input; and
- the computer system automatically re-positioning two or more nodes of the plurality of nodes in response to displaying the new node at the first position, wherein automatically re-positioning the two or more nodes includes:
  - automatically re-positioning a first node that passes data as input to a second node, wherein the first node is initially positioned above and leftward of the second node, wherein automatically re-positioning the first node comprises automatically moving the first node in a rightward direction to a new position;
  - automatically determining that the new position of the first node violates the left-to-right data flow semantics with respect to the data passed as input to the second node; and
  - in response to said determining that the new position of the first node violates the left-to-right data flow semantics, automatically re-positioning the second node in a rightward direction to a new position so that the first node remains positioned above and leftward of the second node, wherein the new position of the second node is not determined based on user input specifying positioning information for the second node.

* * * * *